(12) United States Patent
Wu

(10) Patent No.: US 11,267,391 B1
(45) Date of Patent: Mar. 8, 2022

(54) VEHICLE HEADLIGHT HAVING A HIGH BEAM UNIT AND LOW BEAM UNIT GENERATING A DAYTIME RUNNING LIGHT MODE WITH HIGH BEAM UNIT

(71) Applicant: COPLUS INC., Tainan (TW)

(72) Inventor: Po-Hua Wu, Tainan (TW)

(73) Assignee: COPLUS INC., Tainan (TW)

( * ) Notice: Subject to any disclaimer, the term of this patent is extended or adjusted under 35 U.S.C. 154(b) by 0 days.

(21) Appl. No.: 17/340,167

(22) Filed: Jun. 7, 2021

(30) Foreign Application Priority Data

Feb. 9, 2021 (TW) .................................. 110105135

(51) Int. Cl.
```
B60Q 1/14       (2006.01)
F21S 41/675     (2018.01)
F21S 41/657     (2018.01)
F21S 43/19      (2018.01)
F21S 43/37      (2018.01)
F21W 103/20     (2018.01)
F21W 102/13     (2018.01)
F21W 103/55     (2018.01)
```
(52) U.S. Cl.
CPC .......... *B60Q 1/1423* (2013.01); *F21S 41/657* (2018.01); *F21S 41/675* (2018.01); *F21S 43/19* (2018.01); *F21S 43/37* (2018.01); *F21W 2102/13* (2018.01); *F21W 2103/20* (2018.01); *F21W 2103/55* (2018.01)

(58) Field of Classification Search
CPC combination set(s) only.
See application file for complete search history.

(56) References Cited

U.S. PATENT DOCUMENTS 10,309,603 B2 * 6/2019 Meyrenaud ............ F21S 41/663
2021/0325015 A1 * 10/2021 Jeong ...................... F21S 41/25

* cited by examiner

*Primary Examiner* — Robert J May
(74) *Attorney, Agent, or Firm* — Burris Law, PLLC

(57) ABSTRACT

A vehicle headlight includes a housing unit, a low beam unit, a high beam unit and a control module. The low beam unit is mounted to the housing unit and is controllable to produce a low beam. The high beam unit is mounted to the housing unit and is controllable to produce a high beam. The control module is communicatively connected between the low beam unit and the high beam unit, and is operable to switch between a high beam mode, in which the high beam unit is controlled to produce the high beam with a first level brightness, and a daytime running mode, in which the high beam unit is controlled to produce the high beam with a second level brightness that is weaker than the first level brightness.

10 Claims, 8 Drawing Sheets

VEHICLE HEADLIGHT HAVING A HIGH BEAM UNIT AND LOW BEAM UNIT GENERATING A DAYTIME RUNNING LIGHT MODE WITH HIGH BEAM UNIT

CROSS-REFERENCE TO RELATED APPLICATION

This application claims priority of Taiwanese Patent Application No. 110105135, filed on Feb. 9, 2021.

FIELD

The disclosure relates to a vehicle, and more particularly to a vehicle headlight.

BACKGROUND

As daytime running light function becomes legally mandated for four-wheeled vehicles in many countries, old vehicles that were manufactured before the implementation of such regulation and that do not have the daytime running light function are often forced to be upgraded to meet the regulation in either of two ways: replacing old headlights by ones that have the daytime running light function or, if desired to keep the old headlights, installing separate daytime running lights to the vehicle bodies.

However, since replacing the old headlights involves redesigning configurations of the headlights (e.g., position and size of a reflector structure of a low-beam module), which results in extra costs, many automotive manufacturers are unwilling to make such investment in their older vehicle models. On the other hand, installing separate daytime running lights is often undesirable in terms of aesthetics.

SUMMARY

Therefore, the object of the disclosure is to provide a vehicle headlight that can alleviate at least one of the drawbacks of the prior art.

According to the disclosure, a vehicle headlight includes a housing unit, a low beam unit, a high beam unit and a control module.

The low beam unit is mounted to the housing unit and is controllable to produce a low beam. The high beam unit is mounted to the housing unit and is controllable to produce a high beam. The control module is communicatively connected between the low beam unit and the high beam unit, and is operable to switch between a high beam mode, in which the high beam unit is controlled to produce the high beam with a first level brightness, and a daytime running mode, in which the high beam unit is controlled to produce the high beam with a second level brightness that is weaker than the first level brightness.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
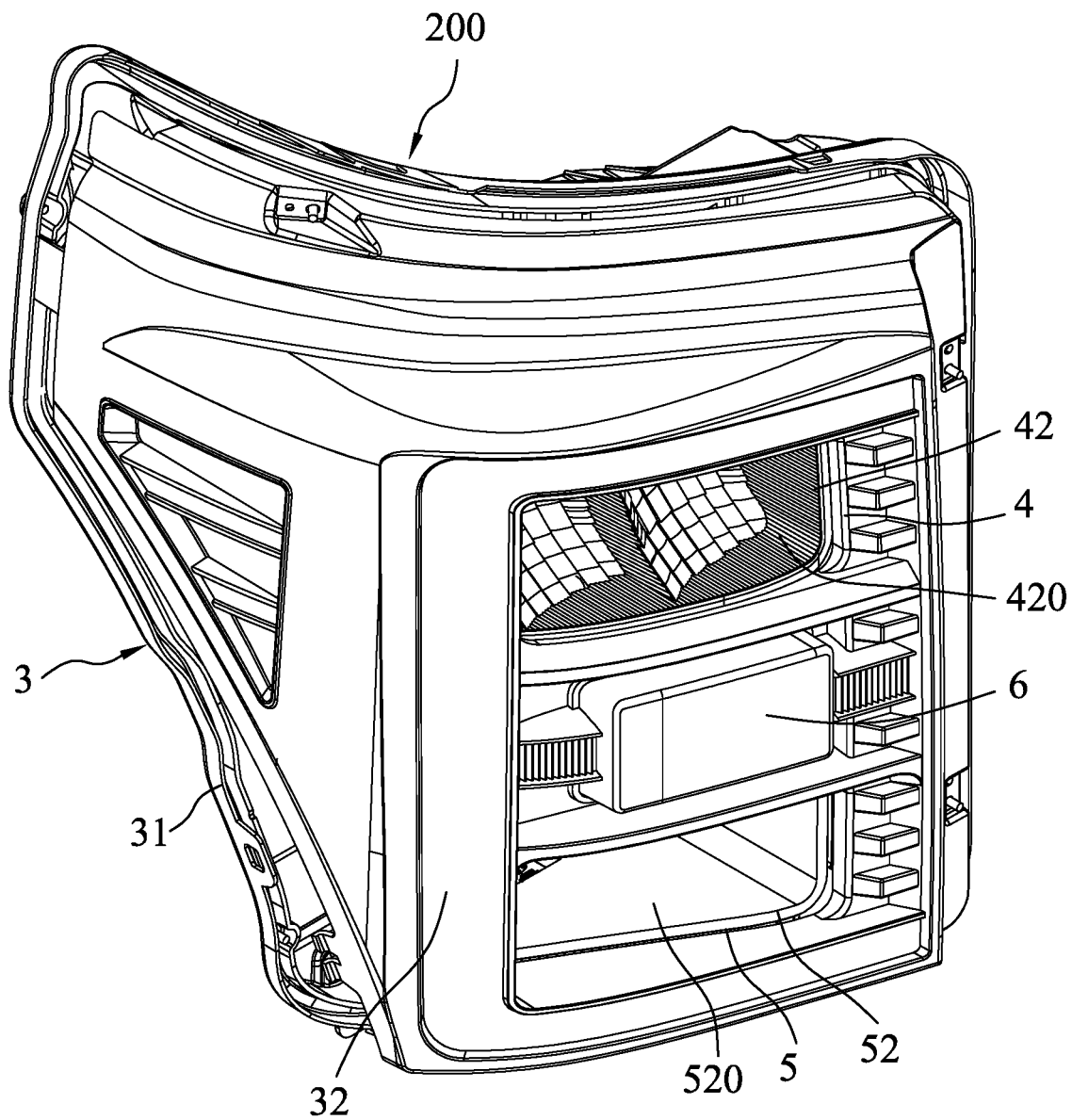
FIG. 1 is a front perspective view of an embodiment of a vehicle headlight according to the disclosure.
Figure 2:
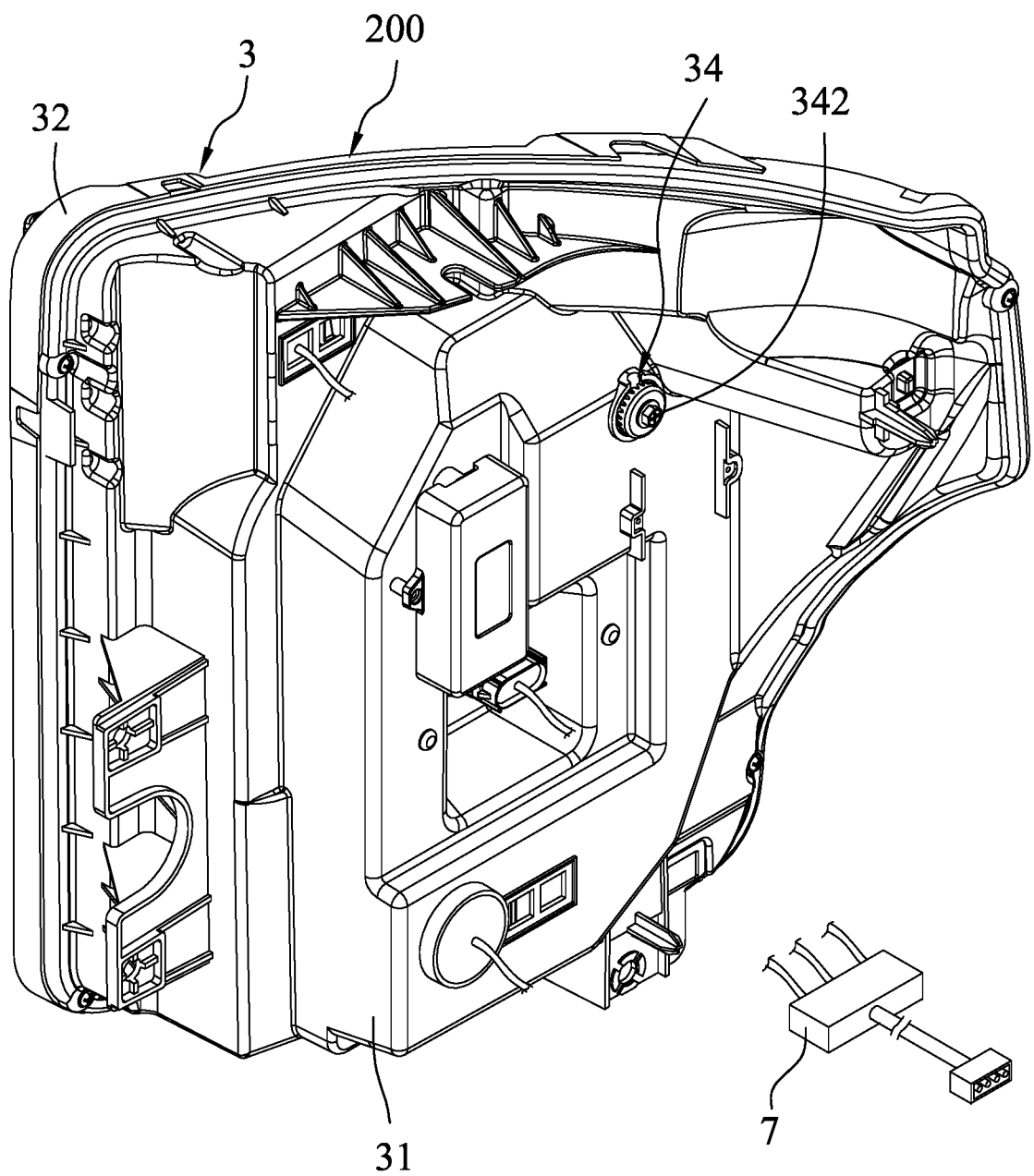
FIG. 2 is a rear perspective view of the embodiment.

Referring to FIGS. 1 and 2, an embodiment of a vehicle headlight 200 according to the disclosure is adapted to be mounted to a vehicle (not shown), whether powered by gas, electricity or hybrid energy, that has four wheels or more than four wheels. The vehicle headlight 200 includes a housing unit 3, a low beam unit 4, a high beam unit 5, a turn light unit 6 and a control module 7.

The housing unit 3 includes a back member 31, a front light cover 32 that is disposed in front of and connected to the back member 31, and a base seat 33 that is disposed between the back member 31 and the front light cover 32. It should be noted that configurations of the back member 31 and the front light cover 32 of the housing unit 3 are not limited to the embodiment shown in the figures of the disclosure, and will not be described in detail hereinafter.

Figure 3:
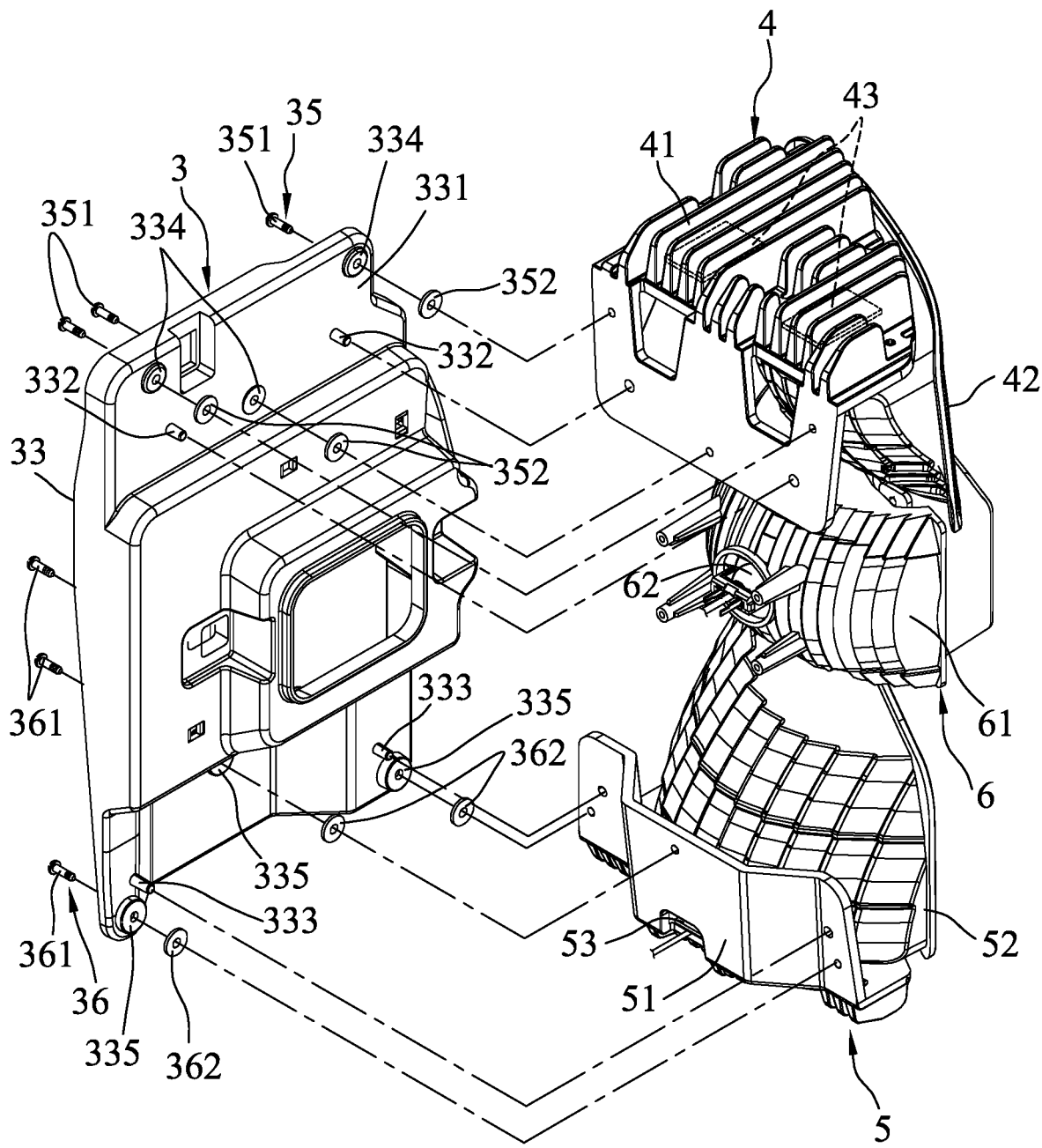
FIG. 3 is an exploded fragmentary perspective view, illustrating a first adjustment unit and a second adjustment unit of the embodiment.
Figure 4:
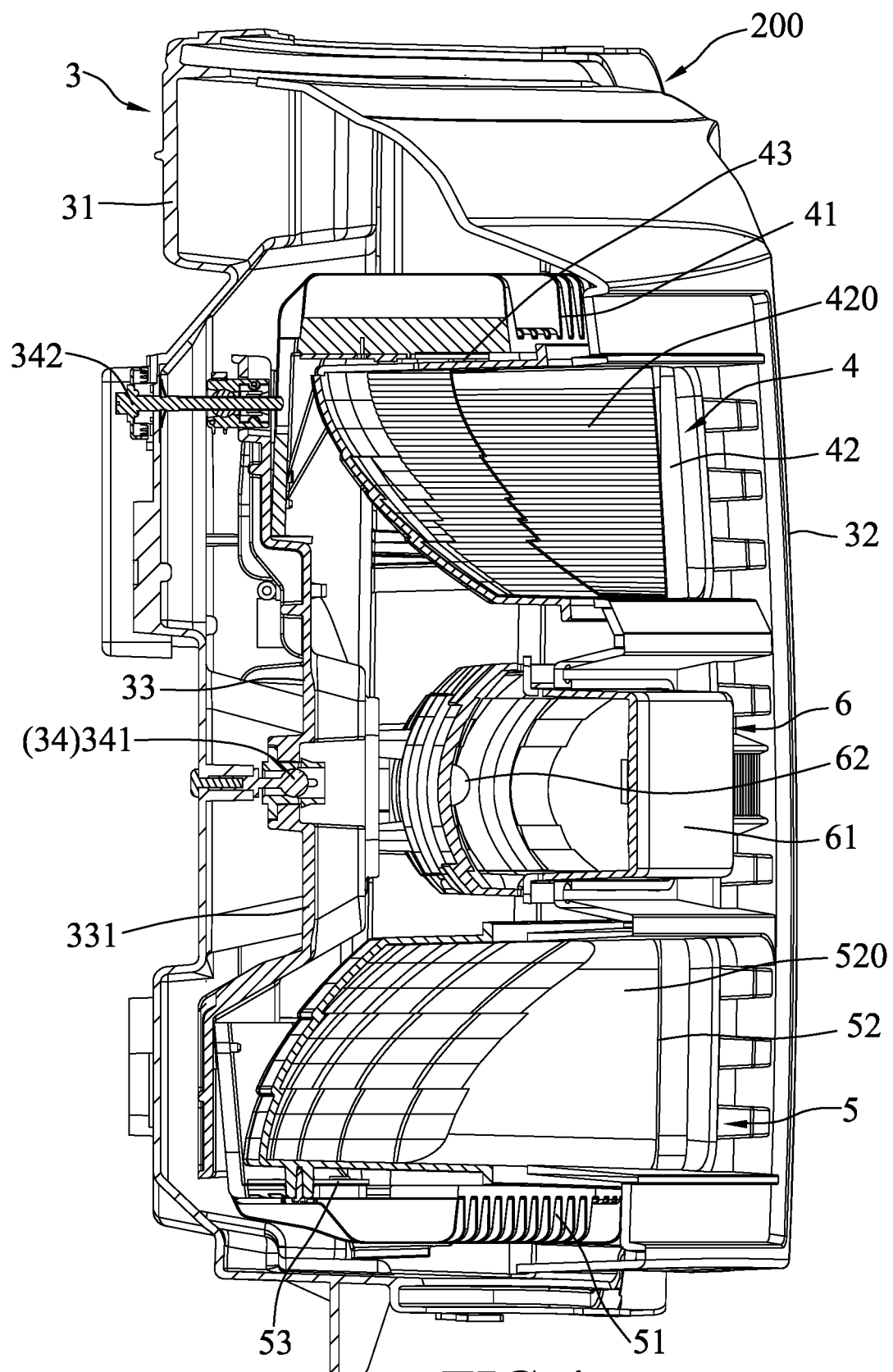
FIG. 4 is an assembled fragmentary perspective view, illustrating the first and second adjustment units.
Figure 5:
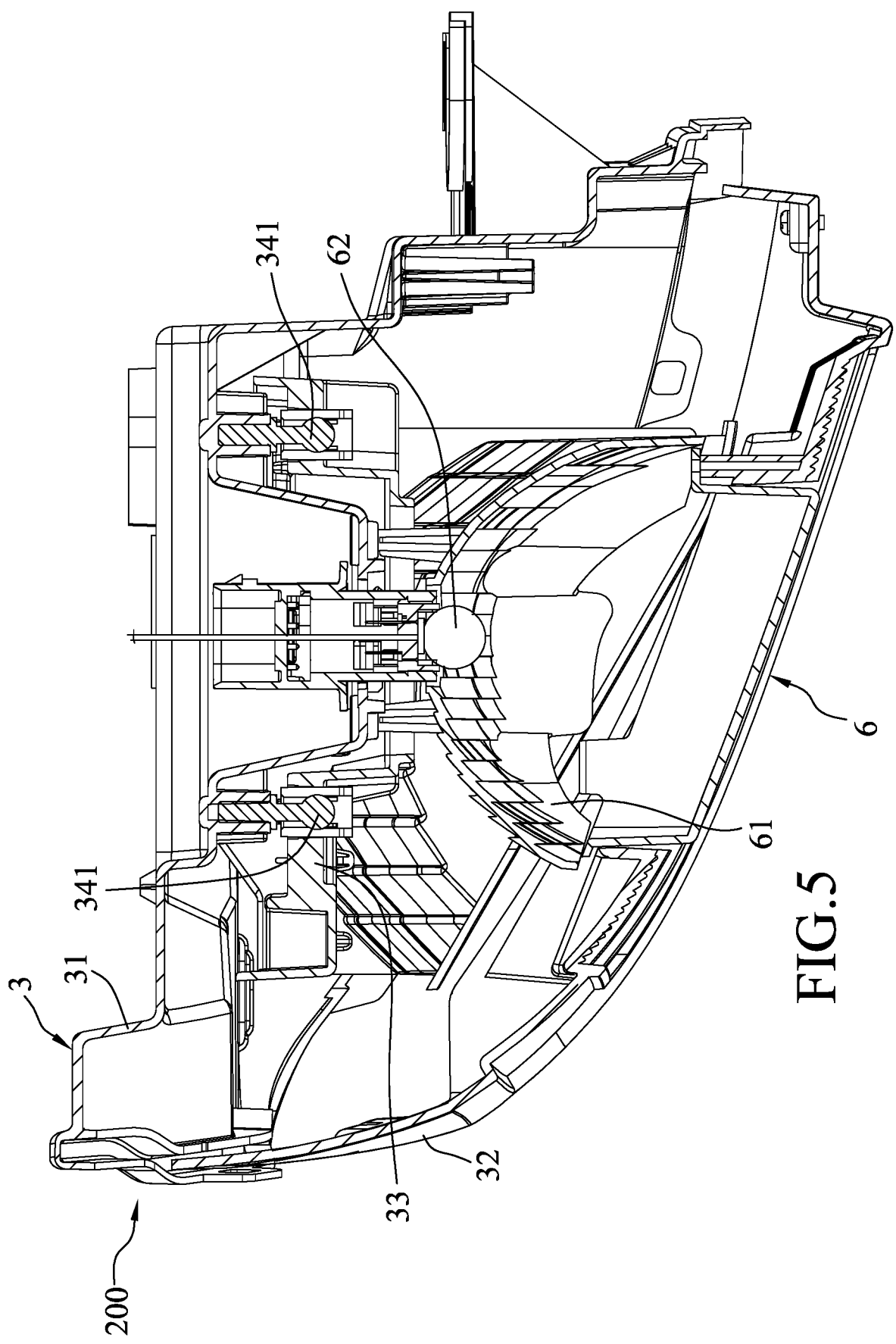
FIG. 5 is a fragmentary sectional view of the embodiment, illustrating a first adjustment bolt that connects a base seat to a low beam unit.

Referring to FIGS. 3, 4 and 5, the base seat 33 is disposed in front of the back member 31, and has a seat body 331, two first insert rod portions 332, two second insert rod portions 333, three first protruding portions 334 and three second protruding portions 335.

The seat body 331 extends in an up-down direction. The first insert rod portions 332 are spaced apart from each other in a left-right direction transverse to the up-down direction, and protrude in a forward direction from an upper segment of the seat body 331 into the low beam unit 4. Specifically, each of the first insert rod portions 332 extends loosely into a receiving hole of the low beam unit 4 (i.e., the diameter of the receiving hole is greater than that of each of the first insert rod portions 332), such that the first insert rod portions 332 are movable in the up-down direction and the left-right direction relative to the low beam unit 4. The first protruding portions 334 are spaced apart from each other, and protrude in the forward direction from the upper segment of the seat body 331 toward the low beam unit 4.

The second insert rod portions 333 are spaced apart from each other in the left-right direction, protrude in the forward direction from a lower segment of the seat body 331 into the high beam unit 5, and are movable in the up-down direction and the left-right direction relative to the high beam unit 5. Specifically, each of the second insert rod portions 333 extends loosely into a receiving hole of the high beam unit 5 (i.e., the diameter of the receiving hole is greater than that of each of the second insert rod portions 333), such that the second insert rod portions 333 are movable in the up-down direction and the left-right direction relative to the high beam unit 5. The second protruding portions 335 are spaced apart from each other, and protrude in the forward direction from the lower segment of the seat body 331 toward the high beam unit 5.

The housing unit 3 further includes a light adjustment unit 34, a first adjustment unit 35 and a second adjustment unit 36. The light adjustment unit 34 is mounted to the back member 31, is connected to the base seat 33, and includes two universal connecting members 341 and a direction adjustment member 342.

The universal connecting members 341 are mounted to the back member 31, are spaced apart in the left-right direction, and are rotatably connected to a middle segment of the seat body 331 of the base seat 33. The direction adjustment member 342 extends through the back member 31 in the forward direction to be threadedly engaged with the upper segment of the seat body 331 of the base seat 33 above one of the universal connecting members 341, and is rotatable to pivot the base seat 33 in the up-down direction and the left-right direction relative to the back member 31 via the universal connecting members 341.

Figure 6:
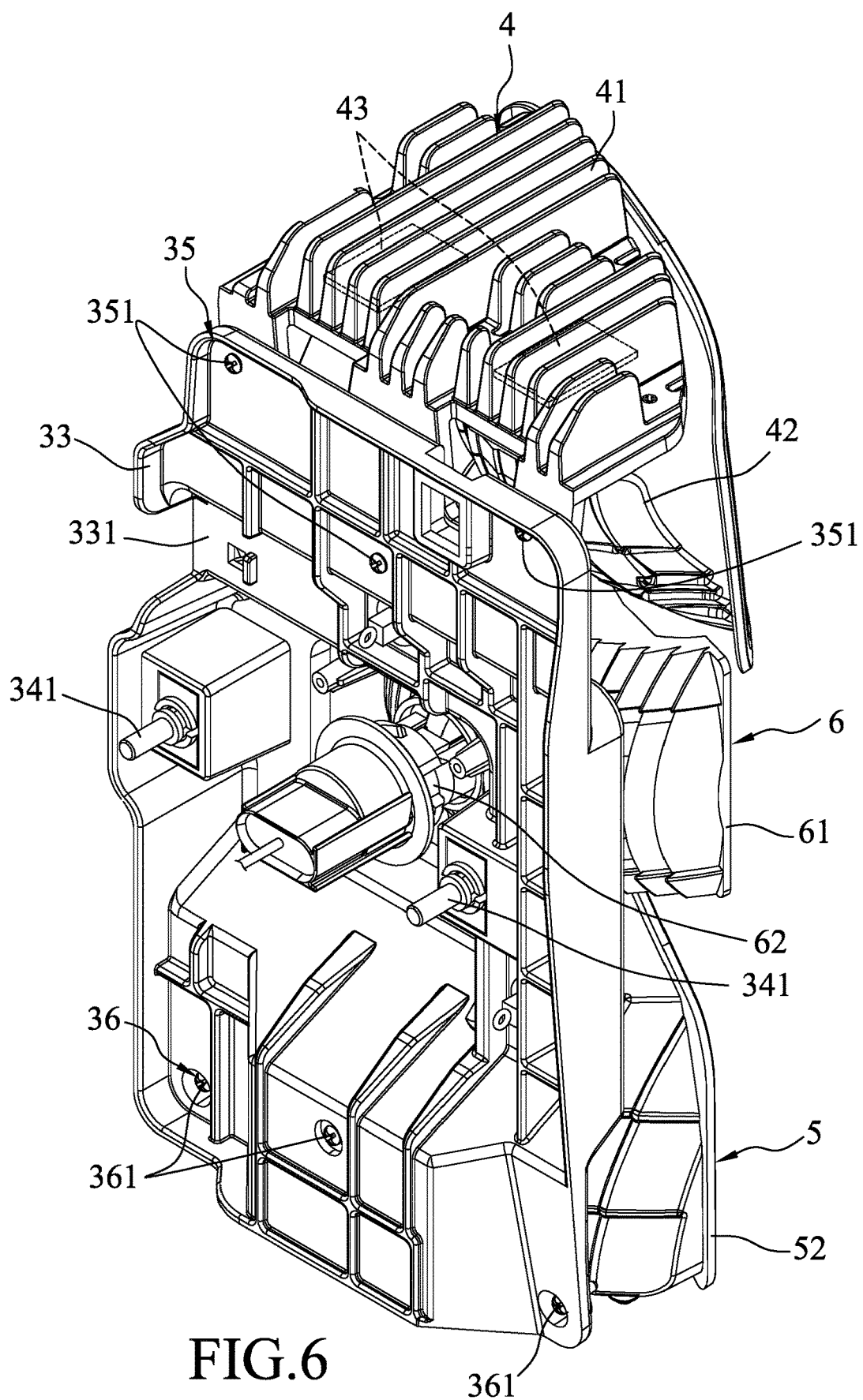
FIG. 6 is a sectional side view of the embodiment.
Figure 7:
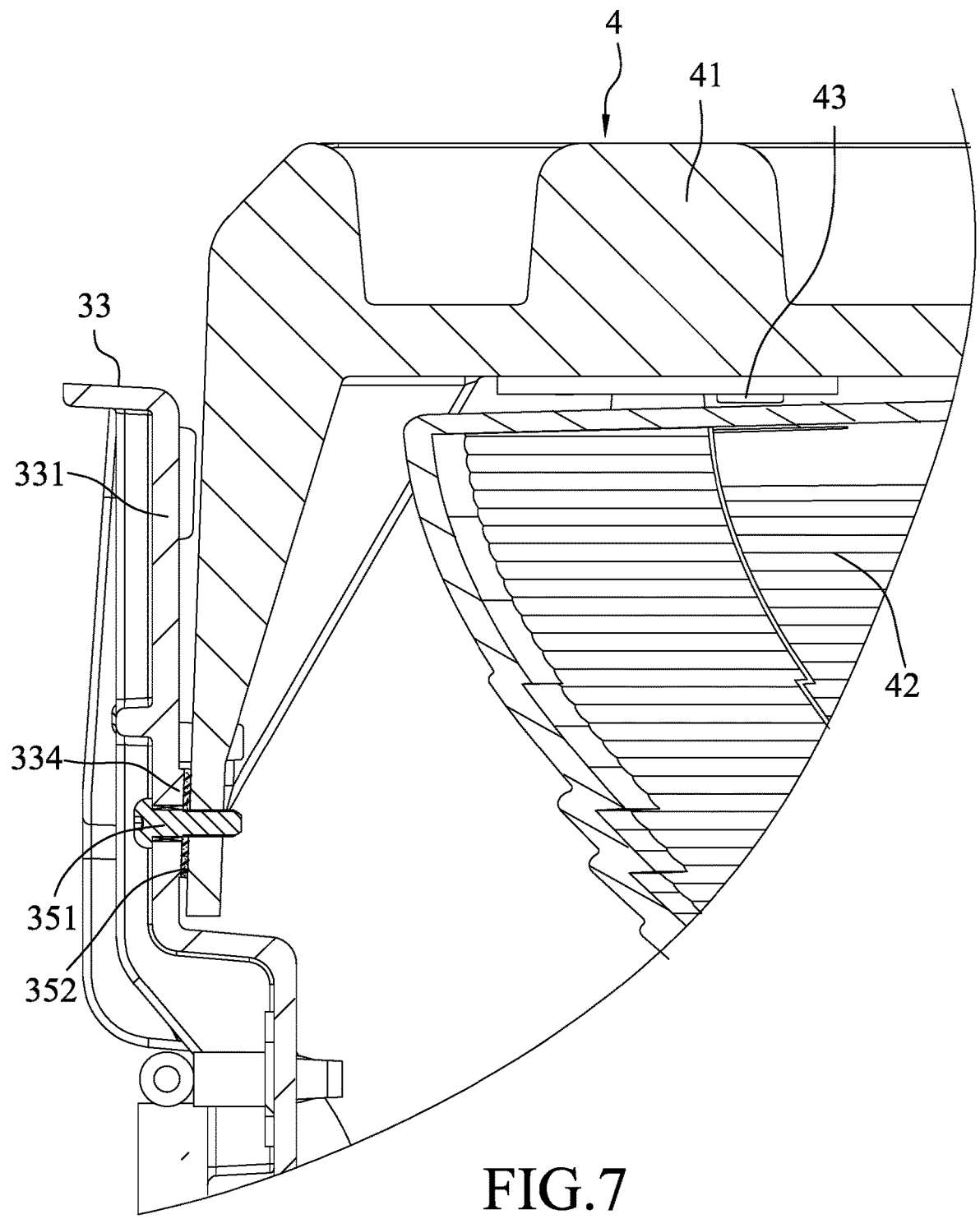
FIG. 7 is a cross-sectional top view of the embodiment.

Referring to FIGS. 3, 6 and 7, the first adjustment unit 35 is mounted to the base seat 33, is connected to the low beam unit 4, and includes three first adjustment bolts 351 and three first washers 352.

The first adjustment bolts 351 are spaced apart from each other, extend through the seat body 331 and the first protruding portions 334 of the base seat 33, and are engaged with the low beam unit 4. Specifically, each of the first adjustment bolts 351 extends rotatably through a respective one of the first protruding portions 334 to be threadedly engaged with the low beam unit 4. Each of the first washers 352 is sleeved on a respective one of the first adjustment bolts 351, and abuts elastically against and is disposed between the respective one of the first protruding portions 334 and the low beam unit 4. As such, the first adjustment bolts 351 are operable to drive the low beam unit 4 to pivot in the up-down direction and the left-right direction relative to the seat body 331 of the base seat 33, and during the pivoting movement of the low beam unit 4, each of the first insert rod portions 332 of the base seat 33 that is received in the receiving hole of the low beam unit 4 serves as a guide to facilitate the movement of the low beam unit 4.

The second adjustment unit 36 is mounted to the base seat 33, is connected to the high beam unit 5, and includes three second adjustment bolts 361 and three second washers 362.

The second adjustment bolts 361 are spaced apart from each other, extend through the seat body 331 of the base seat 331, and are engaged with the high beam unit 5. Specifically, each of the second adjustment bolts 361 extends rotatably through a respective one of the second protruding portions 335 to be threadedly engaged with the high beam unit 5. Each of the second washers 362 is sleeved on a respective one of the second adjustment bolts 361, and abuts elastically against and is disposed between the respective one of the second protruding portions 335 and the high beam unit 5. As such, the second adjustment bolts 361 are operable to drive the high beam unit 5 to pivot in the up-down direction and the left-right direction relative to the seat body 331 of the base seat 33, and during the pivoting movement of the high beam unit 5, each of the second insert rod portions 333 of the base seat 33 that is received in the receiving hole of the high beam unit 5 serves as a guide to facilitate the movement of the high beam unit 5.

Referring to FIGS. 1, 3 and 4, the low beam unit 4 is mounted to the housing unit 3, is controllable to produce a low beam, and includes a low beam mounting seat 41, a low beam reflector 42 and two first light-emitting members 43.

The low beam mounting seat 41 is formed with receiving holes for the first insert rod portions 332 to extend thereinto, and is configured for the first protruding portions 334 to protrude forwardly thereinto, for the first adjustment bolts 351 to be threadedly engaged therewith, and for the first washers 352 to abut elastically thereagainst.

The low beam reflector 42 is mounted to the low beam mounting seat 41 and has a first reflective surface 420. The first light-emitting members 43 are mounted to the low beam mounting seat 41, and are configured to emit light toward the first reflective surface 420. The first reflective surface 420 is configured to reflect the light to travel in the forward direction, such that the light passes through the front light cover 32 to form the low beam. It should be noted that, in variations of the embodiment, the low beam unit 4 may include only one first light-emitting member 43.

The high beam unit 5 is mounted to the housing unit 3, is controllable to produce a high beam, and includes a high beam mounting seat 51, a high beam reflector 52 and a second light-emitting member 53.

The high beam mounting seat 51 is formed with the receiving holes for the second insert rod portions 333 to extend thereinto, and is configured for the second protruding portions 335 to protrude forwardly thereinto, for the second adjustment bolts 361 to be threadedly engaged therewith, and for the second washers 362 to abut elastically thereagainst.

The high beam reflector 52 is mounted to the high beam mounting seat 51 and has a second reflective surface 520. The second light-emitting member 53 is mounted to the high beam mounting seat 51, and is configured to emit light toward the second reflective surface 520. The second reflective surface 520 is configured to reflect the light to travel in the forward direction, such that the light passes through the front light cover 32 to form the high beam.

The turn light unit 6 is mounted to the housing unit 3 between the low beam unit 4 and the high beam unit 5, is controllable to produce a light beam (e.g., a turn signal), and includes a turn light reflector 61 and a third light-emitting member 62.

The turn light reflector 61 is mounted to the base seat 33 of the housing unit 3. The third light-emitting member 62 is mounted to the base seat 33 and is disposed in and exposed outwardly from the turn light reflector 61. The turn light reflector 61 is configured to reflect light emitted by the third light-emitting member 62 to travel in the forward direction, such that the light passes through the front light cover 32 to form the light beam.

It should be noted that, the first light-emitting members 43, the second light-emitting members 53 and the third light-emitting member 62 are configured as LED light modules in the present embodiment, but are not limited thereto in variations of the embodiment.

Figure 8:
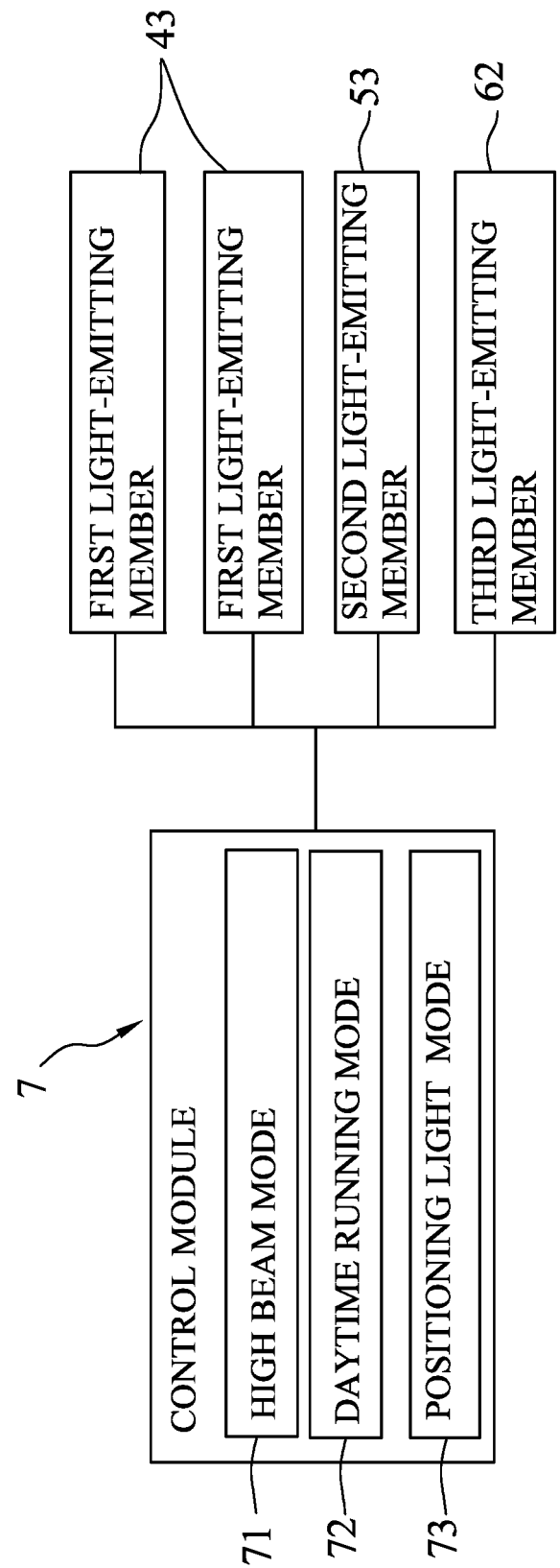
FIG. 8 is a block diagram, illustrating a control module of the embodiment being communicatively connected to a plurality of light-emitting members.

Referring to FIG. 8, the control module 7 is communicatively connected to the low beam unit 4, the high beam unit 5 and the turn light unit 6 so as to control the first light-emitting members 43, the second light-emitting members 53 and the third light-emitting member 62. The control module 7 is operable to switch among a high beam mode 71, a daytime running mode 72 and a positioning light mode 73.

When the control module 7 is in the high beam mode 71, the second light-emitting member 53 of the high beam unit 5 is controlled to produce the high beam with a first level brightness, providing a regular high beam function. When the control module 7 is in the daytime running mode 72, the second light-emitting member 53 of the high beam unit 5 is controlled to produce the high beam with a second level brightness that is weaker than the first level brightness, serving as a daytime running light. When the control module 7 is in the positioning light mode 73, the second light-emitting member 53 of the high beam unit 5 is controlled to produce the high beam with a third level brightness that is weaker than the second level brightness, serving as a positioning light.

Referring to FIGS. 1, 2, and 8, when the vehicle headlight 200 of the present embodiment is mounted to the vehicle, the control module 7 is connected to a light control system (not shown) of the vehicle. When the vehicle is running, a user can operate on the control module 7, through the light control system, to control the low beam unit 4, the high beam unit 5 and the turn light unit 6 to respectively produce the low beam, the high beam, and the light beam for turning instructions or warnings.

When the control module 7 is switched to the high beam mode 71, the high beam unit 5 is controlled to produce the high beam with the first level brightness for the user to see further down the road (e.g., during nighttime). When the control module 7 is switched to the daytime running mode 72, the high beam unit 5 is controlled to reduce the brightness of the high beam (i.e., to the second level brightness), which is suitable for the user to drive during daytime. When the control module 7 is switched to the positioning light mode 73, the high beam unit 5 is controlled to further reduce the brightness of the high beam (i.e., to the third level brightness), which is suitable for an observer (e.g. a driver in a nearby vehicle) to position the vehicle.

Referring to FIGS. 4, 6 and 7, it should be noted that, when the vehicle headlight 200 is assembled during manufacturing, the angular positions of the low beam unit 4, the high beam unit 5 and the turn light unit 6 are adjustable to meet specific requirements. Specifically, when the angular position of the low beam unit 4 is to be fine-tuned individually, the first adjustment bolts 351 are adjusted to drive the low beam unit 4 to compress the first washers 352, such that the low beam unit 4 moves slightly in the up-down direction and the left-right direction relative to the base seat 33. Similarly, when the angular position of the high beam unit 5 is to be fine-tuned individually, the second adjustment bolts 361 are adjusted to drive the high beam unit 5 to compress the second washers 362, such that the high beam unit 5 moves slightly in the up-down direction and the left-right direction relative to the base seat 33.

When the angular positions of the low beam unit 4, the high beam unit 5 and the turn light unit 6 are to be adjusted simultaneously, the direction adjustment member 342 of the light adjustment unit 34 is adjusted to drive the base seat 33 to move in the up-down direction and left-right direction relative to the back member 31 via the universal connecting members 341.

In sum, benefits of the present embodiment according to the disclosure are as follows.

By virtue of the control module 7 being able to switch among the high beam mode 71, the daytime running mode 72 and the positioning light mode 73, a vehicle mounted with the vehicle headlight 200 of the disclosure is able to meet the regulation of having the daytime running light function without the need to alter any configurations of its original headlight.

In addition, by virtue of the light adjustment unit 34, the first adjustment unit 35 and the second adjustment unit 36 of the housing unit 3, the angular positions of the low beam unit 4, the high beam unit 5 and the turn light unit 6 can be adjusted simultaneously or be fine-tuned individually, providing the user with great flexibility and convenience.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A vehicle headlight comprising:
   a housing unit;
   a low beam unit mounted to said housing unit and being controllable to produce a low beam;
   a high beam unit mounted to said housing unit and being controllable to produce a high beam; and
   a control module communicatively connected between said low beam unit and said high beam unit, and being operable to switch between
      a high beam mode, in which said high beam unit is controlled to produce said high beam with a first level brightness, and
      a daytime running mode, in which said high beam unit is controlled to produce said high beam with a second level brightness that is weaker than said first level brightness.

2. The vehicle headlight as claimed in claim 1, wherein said housing unit includes a base seat, and a first adjustment unit that is mounted to said base seat, that is connected to said low beam unit, and that is operable to drive said low beam unit to pivot in an up-down direction and a left-right direction relative to said base seat.

3. The vehicle headlight as claimed in claim 2, wherein:
   said low beam unit includes a low beam mounting seat, a low beam reflector that is mounted to said low beam mounting seat, and that has a first reflective surface, and a first light-emitting member that is mounted to said low beam mounting seat, and that is configured to emit light toward said first reflective surface, said first reflective surface being configured to reflect said light to travel in a forward direction;
   said base seat has a seat body, and two first insert rod portions that are spaced apart from each other in the left-right direction, that protrude in the forward direction from said seat body into said low beam mounting seat, and that are movable in the up-down direction and the left-right direction relative to said low beam mounting seat; and
   said first adjustment unit includes three first adjustment bolts that are spaced apart from each other, that extend through said seat body, and that are threadedly engaged with said low beam mounting seat.

4. The vehicle headlight as claimed in claim 2, further comprising a turn light unit that is mounted to said housing unit and that is controllable to produce a light beam, said turn light unit including a turn light reflector that is mounted to said base seat, and a light-emitting member that is mounted to said base seat, and that is exposed outwardly from said turn light reflector, said turn light reflector being configured to reflect said light to travel in the forward direction.

5. The vehicle headlight as claimed in claim 3, wherein:
said base seat further has three first protruding portions that protrude in the forward direction from said seat body toward said low beam mounting seat, each of said first adjustment bolts extending rotatably through a respective one of said first protruding portions to be threadedly engaged with said low beam mounting seat; and said first adjustment unit further includes three first washers, each of said first washers being sleeved on a respective one of said first adjustment bolts, and abutting elastically against and disposed between the respective one of said first protruding portions and said low beam mounting seat.

6. The vehicle headlight as claimed in claim 5, wherein said housing unit further includes a second adjustment unit that is mounted to said base seat, that is connected to said high beam unit, and that is operable to drive said high beam unit to pivot in the up-down direction and the left-right direction relative to said base seat.

7. The vehicle headlight as claimed in claim 6, wherein:
said high beam unit includes a high beam mounting seat, a high beam reflector that is mounted to said high beam mounting seat, and that has a second reflective surface, and a second light-emitting member that is mounted to said high beam mounting seat, and that is configured to emit light toward said second reflective surface, said second reflective surface being configured to reflect said light to travel in the forward direction;

said base seat has a seat body, and two second insert rod portions that are spaced apart from each other in the left-right direction, that protrude in the forward direction from said seat body into said high beam mounting seat, and that are movable in the up-down direction and the left-right direction relative to said high beam mounting seat; and said second adjustment unit includes three second adjustment bolts that are spaced apart from each other, that extend through said seat body, and that are threadedly engaged with said high beam mounting seat.

8. The vehicle headlight as claimed in claim 6, wherein said housing unit further includes:
a back member that is disposed behind said base seat; and
a light adjustment unit that is mounted to said back member, that is connected to said base seat, and that includes
two universal connecting members mounted to said back member, being spaced apart in the left-right direction, and rotatably connected to said base seat, and
a direction adjustment member extending through said back member in the forward direction to be threadedly engaged with said base seat, and being rotatable to pivot said base seat in the up-down direction relative to said back member via said universal connecting members.

9. The vehicle headlight as claimed in claim 7, wherein:
said base seat further has three second protruding portions that protrude in the forward direction from said seat body toward said high beam mounting seat, each of said second adjustment bolts extending rotatably through a respective one of said second protruding portions to be threadedly engaged with said high beam mounting seat; and said second adjustment unit further includes three second washers, each of said second washers being sleeved on a respective one of said second adjustment bolts, and abutting elastically against and disposed between the respective one of said second protruding portions and said high beam mounting seat.

10. The vehicle headlight as claimed in claim 1, wherein said control module is further operable to switch to a positioning light mode, in which said high beam unit is controlled to produce said high beam with a third level brightness that is weaker than said second level brightness.

* * * * *